2,914,835
METHOD OF CRIMPING FIBROUS GLASS STRAND

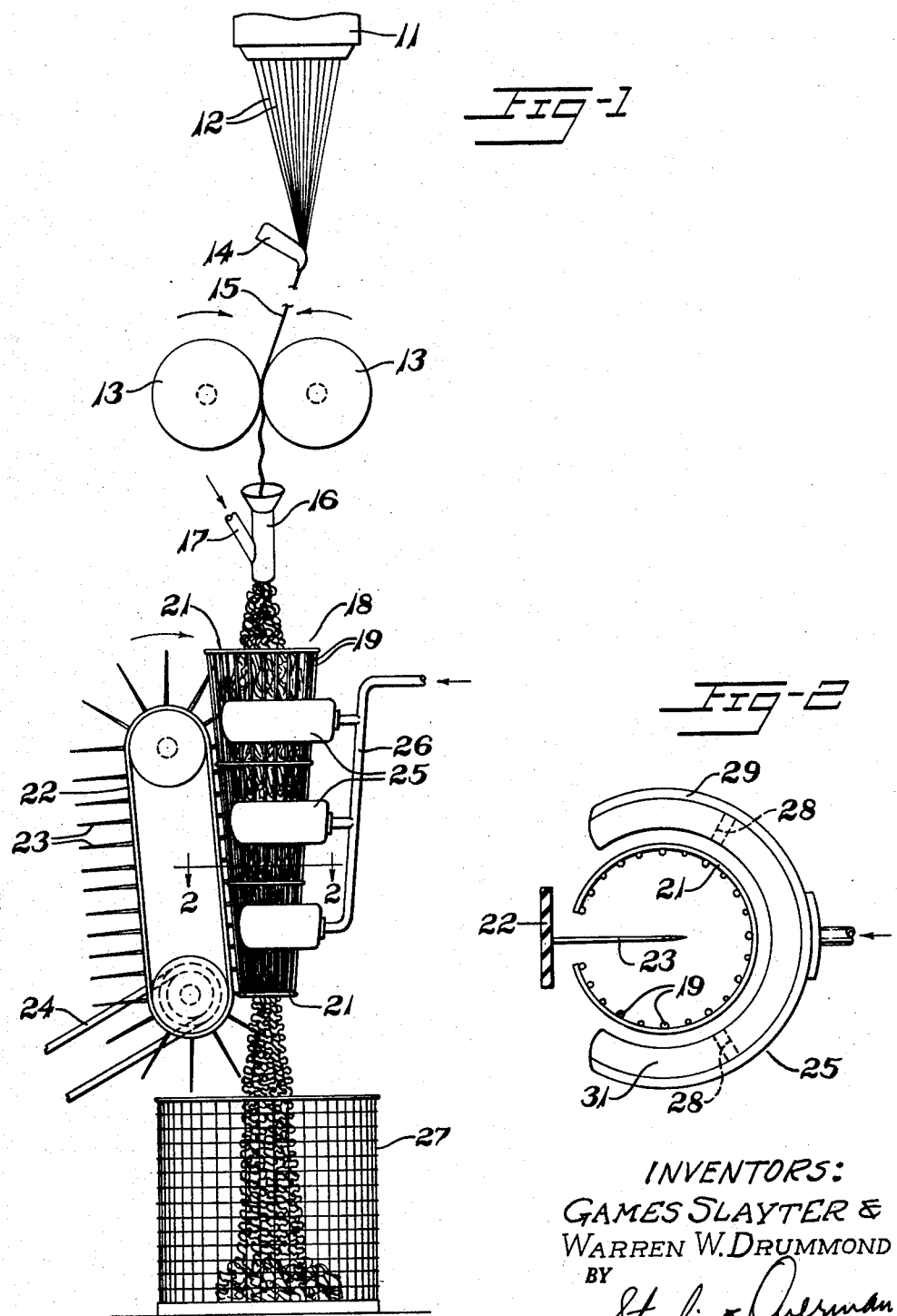

Games Slayter, Newark, Ohio, and Warren Wendell Drummond, Anderson, S.C., assignors to Owens-Corning Fiberglas Corporation, a corporation of Delaware Application March 4, 1954, Serial No. 414,029

4 Claims. (Cl. 28—72)

This invention relates to fibrous glass manufacture and especially to methods and apparatus for producing strand and fiber having novel configurations.

In the past strands of fibrous glass have been produced by attenuating and gathering into a strand a plurality of individual fibers using a suitable pulling device such as a collet winder, a pair of pulling wheels, or the like. Such strands have been used in many reinforced resin products, in textile products and in various other uses; however, it has been desirable to obtain a bulky strand which would be capable of being twisted and woven into fabric for special uses. In the past it has been impossible to provide a bulky strand having the proper characteristics for this use. Likewise a strand which is completely wet out by resin to ensure a smooth-surfaced molded product has not been available.

It is an object of this invention to provide a bulky strand which is easily removed from a package of the strand.

It is an object to provide a fibrous glass strand comprising fibers having the proper configuration to provide bulkiness in the strand.

It is a further object to provide strand which can be twisted and then woven.

It is also an object to provide bulkiness in a strand over and above that provided in a strand of uncrimped fibers of the same yardage.

It is an object to provide a staple-like product.

It is a further object to provide a fibrous glass material well adapted for reinforcing resinous materials, paper and the like.

Further objects lie in providing methods and apparatus for producing such materials.

The objects of this invention are achieved by methods and apparatus which can best be described by reference to the drawings:

Figure 1 is a schematic view of apparatus used in carrying out the invention; and Figure 2 is a cross section on line 2—2 of Figure 1.

The apparatus comprises a feeder 11 which is adapted for receiving a supply of molten glass from a glass melter (not shown). A plurality of individual fibers 12, 12 are formed from an equal number of streams of molten glass which issue from orifices disposed in feeder 11. The individual fibers 12, 12 are attenuated by the action of pulling wheels 13, 13 disposed below the feeder 11.

A gathering device 14 combines the individual fibers 12, 12 into a strand 15. An air blower 16 is disposed below the pulling wheels and comprises a pipe provided with a funnel top and an air inlet.

Underneath air blower 16 is a stuffing box 18 comprising a plurality of generally vertical wires 19 which are secured by rings 21, 21. Rings 21, 21 are open as is seen in Figure 2. A belt 22 having pins 23, 23 secured thereto is disposed adjacent to the stuffing box 18. Belt 22 rotates due to the action of drive belt 24 in such a manner that the pins 23, 23 which protrude into the stuffing box advance downwardly through the stuffing box and then exit at the bottom as shown in Figure 1. The stuffing box 18 is provided with heating means such as radiant burners 25, 25 which are coupled with a fuel manifold 26. Situated beneath the stuffing box 18 is a wire basket 27 adapted for receiving the crimped product emitting from the stuffing box.

In one method of operating the apparatus shown in the drawings, molten glass is introduced into feeder 11 which is heated electrically and streams of glass emit from the plurality of orifices in the feeder and bead down to form coarse fibers. These fibers are pulled downwardly by the operator, are placed in the gathering device 14, and are then introduced into the pulling wheels 13, 13 as the wheels commence to rotate. A treating solution comprising a surface active agent and water may be applied at the gathering device 14 or by any other suitable means such as a spraying device, roll applicator, or the like. As the strand passes downwardly from the pulling wheels 13, 13, it is an integral strand traveling at speeds of about 10,000 feet per minute. After the strand is emitting from the pulling wheels at usual operating speeds, air blower 16 is pivoted or otherwise placed into position under the pulling wheels so that the strand passes through the air gun. Air is introduced through inlet 17 to disperse the fibers of the strand.

As the strand is packed in the stuffing box, the strand and its spaced apart fibers are bent and looped about adjacent strands and fibers. The bending of the strand and the fibers within the strand over one another and over wires 19, 19 of stuffing box 18 and the stuffing action within the box provides a sharp crimp of short wave length in the fiber and strand. Radiant burners 25, 25 which are gas-fired are lighted to provide heat for setting the crimp in the looped strand of dispersed fibers in the stuffing box. The gas is introduced through manifold 26 and thence through the burners hollow steel shell 29 which has openings aligned with the openings 28, 28 in the ceramic liner 31. The flame spreads over the entire exposed face of the ceramic liner. While the crimped strand passes downwardly through stuffing box 18, it is heated to a temperature of from about 600° to 1200° F., and preferably to from 800° to 1000° F., at which temperature the glass is heat set in the crimped position. As the strand emits from the stuffing box 18, it is cooled rapidly below the lowermost radiant burner and the strand is permanently crimped. The crimped strand then falls downwardly into wire basket 27 which is a receptacle for the product.

Tightly crimped strand is produced as follows. Two-hundred and four fibers emitting from a feeder are gathered upon gathering device 14 into the form of a strand 15 and then this strand is pulled downwardly by the action of pulling wheels 13, 13. A surface active agent such as a 5% solution of alkyl dimethyl benzyl ammonium chloride is applied at the gathering device 14. The fibers within the strand are dispersed by the effects of air blower 16 into which air under pressure is introduced. The dispersed strand is directed forcefully into stuffing box 18 and therein the temperature of the strand is raised to 800° F. Conveyor 22 proceeds at the proper speed to allow the strand to remain in the stuffing box for from four to five minutes. The five minutes elapses from the time the strand first enters the stuffing box until it exits as a finished product. The strand so produced is tightly crimped and is entirely satisfactory for many uses including the following:

(1) Reinforcement for resin
(2) Reinforcement for paper
(3) Filler for electrical insulation
(4) Insulating material
(5) For preparing spun yarn
(6) Cushioning material The strand so formed is very easily removed from the package formed in wire basket 27.

If desirable, air blower 16 need not be used. The strand from the pulling wheels is then directed immediately into the stuffing box 18. The strand is crimped as before; however the fibers within the strand are not dispersed as much as when the air blower is used. Some bulkiness is provided but the product is not as fluffy as the crimped, dispersed strand.

Any desirable heating means may be used instead of the radiant burners, if it is desirable to do so. For instance, Calrod electrical heaters may be disposed about the stuffing box in order to provide sufficient heat for crimp setting the strand within the stuffing box. Although the stuffing box 18 is shown with a round cross section, other configurations can be used. For instance, it may have a generally elliptical cross section or the stuffing box may be rectangular. It is necessary, however, to use a configuration which allows the strand within the stuffing box to come to the proper temperature to heat set the crimp. The stuffing box can be replaced by a pair of opposed coacting metal belts also, which belts would catch the strand and compact the loops formed therebetween.

The pulling wheels 13, 13 are shown having a generally smooth periphery; however they may be provided with a roughened surface by applying a scalloped tread or a tread having a plurality of flippers or the like in order to set up a wave pattern in the strand emitted. A strand having a pronounced wave pattern is effected by the air blower even more than a driven strand travelling in a more nearly straight path.

Air blower 16 is shown with an air inlet tube 17 disposed at an angle. It has been found that the angle between the body of the blower having the funnel inlet and the air inlet tube should be greater than 10° and less than 45°. The angle is preferably from 12° to 30° or slightly more. If the included angle is too low the strand is not dispersed or broken up and if the angle is too great the incoming air tends to pass upwardly through the blower. Although it may sometimes be preferred to provide some back pressure in the air blower, generally it has been found best to direct the air downwardly. The strand is believed to be deflected off the inner wall of the blower by the air coming through the air inlet and thereby dispersed; however it is not certain what action takes place within the air blower. Suffice it to say that when the included angle is about 30°, the strand emits as a group of spaced apart fibers, with some fibers being looped and broken.

Other air guns may be used but it is believed that a disrupted flow of air for dispersing the fibers is preferable to a uniform or laminar flow of air. Any gun which provides such a disturbed flow of air may be used.

In another embodiment the crimped strand is set by applying a suitable binder which sets up while the strand is in the stuffing box. Instead of heat setting the crimp, it is possible to apply a binder before or after the wheels which, after it sets firmly, binds the strand in the crimped position. Depending upon the binder used it may or may not be necessary to add heat in order to set the binder. Thus strand from the pulling wheels is directed through an air blower, if desired, and then into the stuffing box where the crimp is binder set.

Some of the binders which may be used are as follows: thermoplastic resins such as polyvinyl acetate, vinyl polymers and the like, thermosetting resins such as the alkyds, melamines, aldehydes and the like, and others.

Specific binders are as follows, parts being by weight:

A.

| Ingredient: | Proportion |
|---|---|
| Water soluble "A" stage phenol formaldehyde resin (50% solids) _____parts__ | 7.5 |
| Water _____do____ | 92.5 |
| Total _____ | 100.0 |

(Apply at forming and cure at from 350° to 400° F.)

B.

| Ingredient: | Proportion |
|---|---|
| Water soluble "A" stage phenol formaldehyde (Bakelite 10709 60% solids) _____parts__ | 834 |
| Polyethylene glycol _____do____ | 50 |
| Water _____do____ | 4116 |
| Total _____ | 5000 |

(Apply at gathering device and cure at from 350° to 400° F.)

C.

| Ingredient: | Proportion |
|---|---|
| Water soluble alkyd resin (Hercules Powder Co. A-49) _____parts__ | 4 |
| Fatty acid amine acetate lubricant ___do____ | 0.25 |
| Water _____do____ | 95.75 |
| Total _____ | 100.00 |

(Apply at forming and cure at from 450° to 500° F.)

D.

| Ingredient: | Proportion |
|---|---|
| Water soluble melamine resin (Resimine 815) _____parts__ | 5 |
| Water _____do____ | 95 |
| Total _____ | 100 |

(Cure at from 350° to 400° F.)

E.

| Ingredient: | Proportion |
|---|---|
| Water soluble phenol formaldehyde resin (Bakelite 17913) _____parts__ | 1000 |
| Sodium siloxanolate (Coupling Agent) (Cowles SS-2D) _____parts__ | 1000 |
| Hydrochloric acid, conc. (Neutralizes sodium siloxanolate) _____ parts__ | 184 |
| Water _____do____ | 7816 |
| Total _____ | 10,000 |

Binders comprising a suitable thermoplastic film former such as polyvinyl acetate may be used to set the crimp in the strand as it is formed in the stuffing box by the action of the downwardly moving pins 23, 23; however the above listed thermosetting resins are preferably used to binder set the crimp. When thermosetting resins are used, it is desirable to elevate the temperature of the resin coated strand by the use of electrical heaters or the like to set the binder on the crimped strand in the stuffing box. The speed of the belt 22 may be increased or decreased as necessary but generally the thermosetting binders can be set in about 3 minutes. The temperature and heating time may vary with the resin which is used.

If desirable, the individual fibers within a strand are coated with such a material as a metal or the like and then the strand product is directed into the stuffing box so that a crimp is provided in the strand. The metal coating once it is crimped holds the strand in the crimped position. The air blower may be used to disperse the metal coated fibers in the strand before the strand is introduced into the crimping box.

When using the combination of a pulling device for advancing the strand and an air blower for dispersing the fibers within the strand, it has been discovered that crimping of the strand and the fibers in the strand is quite pronounced as long as the collection means is positioned immediately adjacent the air blower or other dispersing means such as a deflector plate or electrostatic field. The crimp imparted by the use of an air gun may be further complemented by the use of a stuffing box such as that shown; however for some uses the crimp resulting from the air gun alone is preferred. The loops and broken filaments in the strand formed by the action of the air gun provides a staple-like product which is well adapted for use as a filler for electrical insulation or as a reinforcing material for paper or the like. A strand so formed has excellent uniformity even though it has a low yarn count.

Such a product is made by removing belt 22 from the position in which it is shown in Figure 1 of the drawings. The stuffing box is now used as a collection means only.

Any wire screen receptacle or basket may be used instead of using the stuffing box sans the belt. The product so collected may be removed from either the bottom of the receptacle or if a collection receptacle such as the wire basket 27 is used the crimped strand may be removed from the top of the receptacle after the package is formed therein.

Unexpectedly enough it has been discovered that the dispersed strand is very easily run out or removed from the package. It would seem that a fuzzy or dispersed strand when collected as haphazardly arranged loops or swirls in a wire basket would be so internetted and entangled that the strand could never be removed as a single end strand. Such is not the case. In fact the dispersed strand is more easily removed from a package than a non-dispersed, integral strand collected in the same manner.

Even more unexpectedly a dispersed strand which is crimp set in a stuffing box likewise is easily removed from a package collected as shown in Figure 1.

In order to prepare a strand having a very tight crimp which is permanently set it is necessary to heat set the crimp by using a stuffing box provided with heaters; however if a less tight crimp is desired the use of an air blower alone may be desirable.

The advantages of the strand produced by the methods of this invention are as follows:

(1) The crimped strand is easily removed from the package as a single end allowing complete and uniform run-out.

(2) Strand can be twisted to provide a product which appears like staple because of filament loops and broken fibers.

(3) Good uniformity at low count.

(4) Well adapted for reinforcing paper.

(5) Provides complete wetting-out and attendant smooth surfaces when combined with a resin in molding processes.

(6) Strand is bulky and is good filling material.

These advantages are provided by the air gun dispersed strand and by the strand which is first dispersed with an air gun and then crimped in a stuffing box. The advantages are even more pronounced in the latter.

The invention is not limited to the use of pulling wheels as the pulling device, but rather is adaptable to be used with any suitable pulling device including air blowers for pulling and other jet pulling devices including those operated by fluids under pressure.

Obvious modifications and variations may be made within the spirit and scope of the appended claims.

We claim:

1. Method of producing crimped fibrous glass comprising advancing fibrous glass strand at a speed of about 10,000 feet per minute toward a treating zone and collecting loops and folds of the strand therein, controllably advancing the strand so collected through the treating zone at a speed less than 10,000 feet per minute, progressively compacting said strand in said treating zone to crimp the fibrous glass, heating said strand while in the treating zone to a temperature of from 600° to 1200° F. for a sufficient time to heat set the crimp and relieve the stresses in said crimped strand, cooling, and removing the crimped strand from the treating zone.

2. Method of crimping fibrous glass strand comprising attenuating a plurality of individual streams of molten glass into fibers, gathering said fibers into the form of an advancing strand, disrupting the integrity of the strand to cause the fibers in the strand to stand apart one from another, compacting said advancing strand in a treating zone to crimp the strand by doubling said strand upon itself repeatedly, compacting the strand still further as it progresses through said treating zone, heating said strand while in said treating zone to about 800° F. for from 4 to 5 minutes, and cooling and removing the crimped strand from said treating zone.

3. Method of crimping fibrous glass comprising advancing a continuous strand of a plurality of individual fibers toward a working zone, directing the strand into a blast of air to disrupt the integrity of said strand and to cause the individual fibers within the strand to stand apart one from another prior to introduction into said working zone, doubling and redoubling at random the disrupted strand upon itself to form crimped strand within said working zone, progressively compacting the crimped strand as it passes through said working zone, and setting the crimp in said strand.

4. Method of producing crimped fibrous glass strand comprising advancing a bundle of filaments in the form of an integral strand along a path toward a working zone, disrupting the integrity of the strand and adding impetus to the disrupted strand as it continues its advancement to said working zone, interrupting, collecting and compacting the advancing disrupted strand as it funnels into the working zone to crimp the strand, and setting the crimp in the strand while in said working zone.

References Cited in the file of this patent

UNITED STATES PATENTS

| | | |
|---|---|---|
| 2,208,632 | Dreyfus | July 23, 1940 |
| 2,313,630 | Dockerty | Mar. 9, 1943 |
| 2,369,481 | Modigliani | Feb. 13, 1945 |
| 2,435,891 | Lodge | Feb. 10, 1948 |
| 2,439,813 | Kulp et al. | Apr. 20, 1948 |
| 2,560,205 | Andren | July 10, 1951 |
| 2,575,781 | Barach | Nov. 20, 1951 |
| 2,575,839 | Rainard | Nov. 20, 1951 |
| 2,622,306 | Anderson | Dec. 23, 1952 |
| 2,638,146 | Roundsville et al. | May 12, 1953 |
| 2,715,309 | Rosenstein et al. | Aug. 16, 1955 |
| 2,734,228 | Hay | Feb. 14, 1956 |
| 2,741,009 | Slayter et al. | Apr. 10, 1956 |